United States Patent
Quintero et al.

(10) Patent No.: US 9,475,980 B2
(45) Date of Patent: Oct. 25, 2016

(54) MICROEMULSION AND NANOEMULSION BREAKER FLUIDS WITH ORGANIC PEROXIDES

(71) Applicant: Baker Hughes Incorporated, Houston, TX (US)

(72) Inventors: Lirio Quintero, Houston, TX (US); Gianna A. Pietrangeli, Houston, TX (US); Frances H. DeBenedictis, Spring, TX (US); Qi Qu, Spring, TX (US); Hong Sun, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 363 days.

(21) Appl. No.: 13/905,775

(22) Filed: May 30, 2013

(65) Prior Publication Data

US 2013/0324445 A1 Dec. 5, 2013

Related U.S. Application Data

(60) Provisional application No. 61/653,464, filed on May 31, 2012.

(51) Int. Cl.
C09K 8/68 (2006.01)
C09K 8/90 (2006.01)

(52) U.S. Cl.
CPC . *C09K 8/68* (2013.01); *C09K 8/90* (2013.01); *C09K 2208/26* (2013.01)

(58) Field of Classification Search
USPC .......................................................... 507/213
See application file for complete search history.

(56) References Cited

U.S. PATENT DOCUMENTS

| 5,447,199 A | 9/1995 | Dawson et al. |
| 2008/0039347 A1* | 2/2008 | Welton et al. ................ 507/213 |
| 2014/0190695 A1* | 7/2014 | Van Zanten ............. C09K 8/88 |
| | | 166/281 |

* cited by examiner

*Primary Examiner* — John J Figueroa
(74) *Attorney, Agent, or Firm* — Mossman Kumar & Tyler PC

(57) ABSTRACT

Incorporating at least oil-soluble organic peroxide into a mixture of an aqueous phase and at least one surfactant creates a breaker fluid that is a microemulsion or a nanoemulsion that can then perform as an internal breaker for reducing the viscosity of aqueous fluids gelled with a polymer, such as a crosslinked polysaccharide. One phase of the breaker fluid is water or water-based, e.g. brine, containing at least one oil-soluble organic peroxide as a non-aqueous internal phase that will, over time and optionally with heat, break the polymer-gelled portion of the gel. The overall breaking using the breaker fluid is slower as compared to introducing the organic peroxide breaker in a non-microemulsified or non-nanoemulsified form.

15 Claims, 1 Drawing Sheet

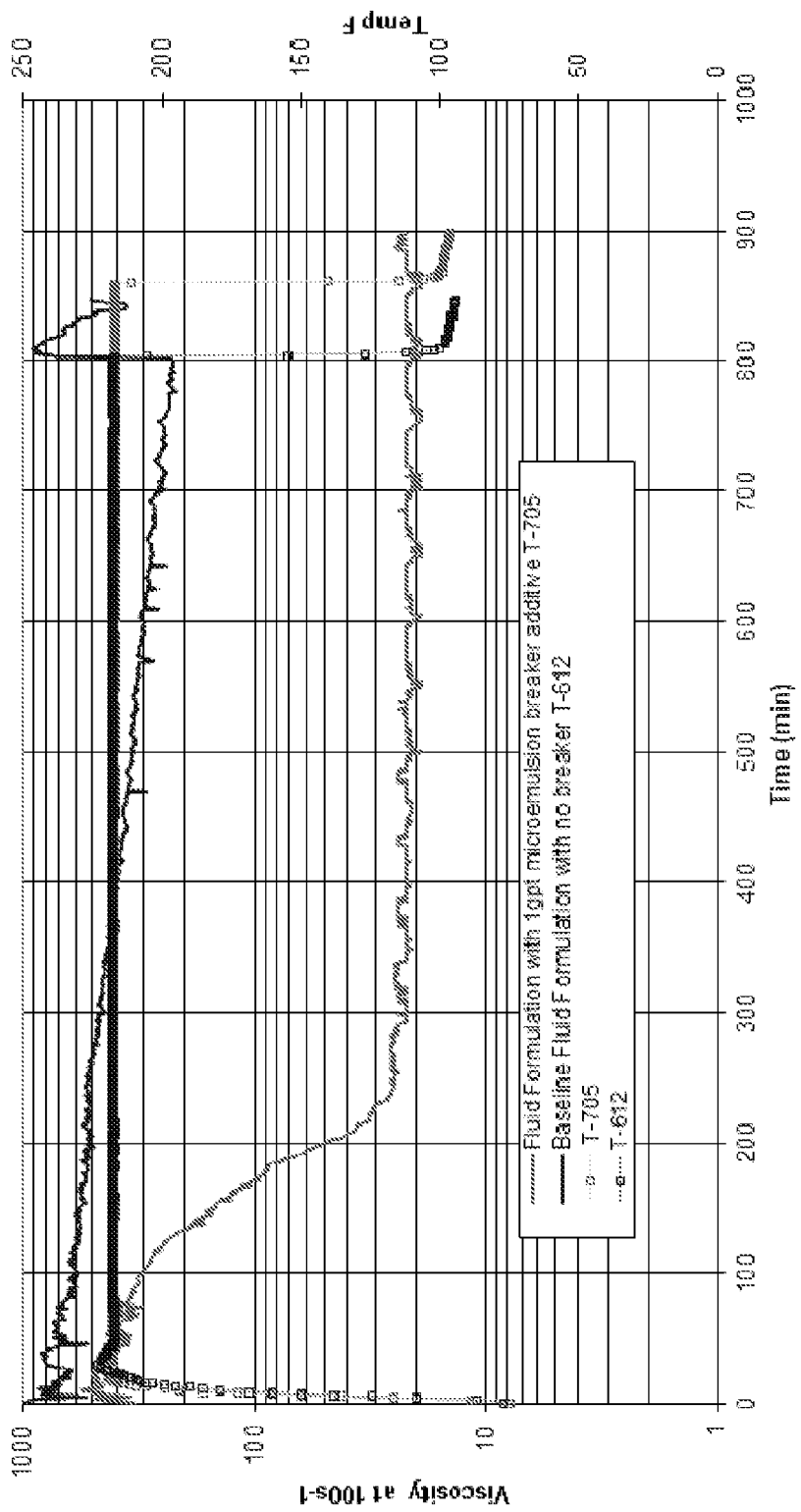

MICROEMULSION AND NANOEMULSION BREAKER FLUIDS WITH ORGANIC PEROXIDES

CROSS-REFERENCE TO RELATED APPLICATION

The present application claims the benefit of U.S. Provisional Patent Application Ser. No. 61/653,464 filed May 31, 2012, incorporated by reference herein in its entirety.

TECHNICAL FIELD

The present invention relates to aqueous viscoelastic fluids, such as those used during subterranean reservoir treatment operations, and more particularly relates, in one non-limiting embodiment, to methods and compositions for "breaking" or reducing the viscosity of such aqueous fluids made viscoelastic using polymers, e.g. crosslinked polysaccharides that are used in hydraulic fracturing.

BACKGROUND

Hydrocarbons such as oil, natural gas, etc., may be obtained from a subterranean geologic formation, e.g., a reservoir, by drilling a well that penetrates the hydrocarbon-bearing formation. This provides a partial flowpath for the hydrocarbons to reach the surface. In order for oil to be produced, that is, travel from the formation to the well bore (and ultimately to the surface), there must be a sufficiently unimpeded flowpath from the formation to the well bore. Unobstructed flow through the formation rock (e.g., sandstone, carbonates) is possible when rock pores of sufficient size and number are present for the oil to move through the formation.

However, many wells cannot produce at economic rates without some sort of stimulation treatment. A common method is to subject the formation to hydraulic fracturing. Fracturing of a subterranean formation is accomplished by pumping a fracturing fluid into the wellbore at a sufficient pressure (above formation parting pressure) and flow rate such that cracks are opened into the surrounding formation. The fracturing fluid typically contains a proppant which functions to prop open created fractures such that hydrocarbons may flow. Productive capability of the well is therefore increased.

The development of suitable fracturing fluids to convey the necessary hydraulic force when forced downhole using hydraulic pumps is a complex art because the fluids must simultaneously meet a number of conditions. For example, they must be stable at high temperatures and/or high pump rates and high shear rates which may cause the fluids to degrade and prematurely settle out the proppant before the fracturing operation is complete. Various fluids have been developed, but most commercially used fracturing fluids are aqueous based liquids which have been either gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation. Aqueous fluids gelled with polymers have also been widely used as gravel-packing, frac-packing because they exhibit excellent rheological properties.

Such hydraulic fracturing fluids may be "broken" or have their viscosities reduced by a separately-added conventional gel breaker such as an oxidizer and/or an enzyme. However, if the breaker is added "externally", that is separately from the hydraulic fracturing fluid, there is often difficulty fully contacting all of the fracturing fluid with the gel breaker since the gel breaker must penetrate and contact the fracturing fluid within all of the fractures. This full contact is rendered more difficult by the fact that the fracturing fluid has, by design, increased viscosity, which may tend to inhibit mixing.

An approach that may work is to use an "internal" breaker that may be pumped and introduced with the fracturing fluid, but which has a delayed break profile until after the hydraulic fracturing is complete. Some current oxidative breakers are solids or encapsulated solids which have delayed breaking profiles because it takes time for the solids to dissolve or time for the encapsulant or shell to dissolve or otherwise disintegrate and release the breaker.

Rheology testing shows that the current oxidative breakers do not work effectively at temperatures from about 180-250° F. (82-121° C.) because even after being broken with these breakers, the fluid "reheals" or gains viscosity when cooled to ambient temperature, even though the fluids show a viscosity decrease in a fracturing fluid at bottom hole temperatures. Increasing the loading of the breaker decreases the initial viscosity of the fracturing fluid and yet may still show rehealing at room temperature.

It would be desirable if alternative internal breaker compositions and methods could be devised for aqueous fluids gelled with polymers to give fluid designers more flexibility when designing the composition and use of polymer-gelled aqueous fluids.

SUMMARY

In one non-limiting embodiment there is provided a method for reducing the viscosity of an aqueous fluid having increased viscosity gelled with a polymer. The method involves incorporating into the gelled aqueous fluid a breaking fluid that is a microemulsion or a nanoemulsion, which breaker fluid contains at least one organic peroxide in an amount effective to reduce the viscosity of the gelled aqueous fluid. The nanoemulsion includes an aqueous external phase, a non-aqueous internal phase comprising at least one organic peroxide, and at least one surfactant effective to form a breaker fluid that is a microemulsion or a nanoemulsion with the aqueous external phase and the non-aqueous internal phase. In another non-restrictive version, the aqueous phase is internal and the non-aqueous phase is external. Microemulsions are bi-continuous where no phase can be considered "internal" or "external". Further the method includes reducing the increased viscosity of the aqueous fluid by contact of the polymer with the at least one organic peroxide.

Additionally, there is provided, in one form, a gelled aqueous fluid including an aqueous base fluid, a polymer in an amount effective to increase the viscosity of the aqueous fluid, a non-aqueous phase comprising at least one organic peroxide, and at least one surfactant effective to form a breaker fluid that is a microemulsion or a nanoemulsion with an aqueous phase and a non-aqueous phase. The amount of organic peroxide is effective to reduce the viscosity of the gelled aqueous fluid.

BRIEF DESCRIPTION OF THE DRAWINGS

The FIGURE is a graph of the viscosity and temperature of an aqueous fluid gelled with a polymer measured at 100 1/s as a function of time showing the results of an aqueous polymer-gelled fluid having no breaker and an otherwise identical polymer-gelled fluid broken with a microemulsion containing an organic peroxide as an internal breaker, as described herein.

DETAILED DESCRIPTION

For many decades, the majority of wells drilled have required hydraulic fracturing treatments to become economically profitable. The primary objective for hydraulic fracturing is to create a high conductivity path from the wellbore to deep within the hydrocarbon bearing reservoir. Conventionally, the most widely used fracturing fluid systems have been crosslinked polymer fluids. Some polymers are naturally occurring, some are modified from their natural origins, and others are synthetic. These fluids exhibit exceptional viscosity, thermal stability, proppant transportability, and fluid leak-off control.

However, a drawback of crosslinked polymer fluids is the amount of polymer residue they too often leave behind that causes fracture conductivity loss. A goal is to completely break and recover all of the fracturing fluid after the fractures have been created. Reducing molecular weight of the polymer component and the fluid viscosity, whether in a gelled fluid, within a fracture or in a filter cake or elsewhere involves degrading the polymer chains.

Technologies have been discovered that will enable post-treatment removal of residual polymer from hydraulic fractures. New internal breakers have been discovered that remain within the polymer wherever it goes during the treatment with a polymer-gelled aqueous fluid. After fractures are created, breakers held in an oil-in-water microemulsion or nanoemulsion may be released to degrade the residual polymers within the fracture and elsewhere. Such technology provides a more complete breaking of the gel since the internal breakers are present within the gel rather than having to closely contact the gel from a separate fluid that must diffuse to and through the gel, often not making complete contact.

It has been discovered that incorporating oil-soluble organic peroxide breakers into a mixture of an aqueous fluid (e.g. water or brine) and at least one surfactant and optionally a co-surfactant or co-solvent creates a microemulsion or nanoemulsion that can then perform as an internal breaker fluid for breaking polymers and thus the fluids. In the case of nanoemulsions the outer phase of the breaker may be aqueous, such as water, or brine, which contains a water-soluble surfactant. In microemulsions the two fluids (aqueous and oleic) coexist in a bicontinuous phase separated by the surfactant molecules. As the water-soluble surfactant diffuses, the oil-soluble organic peroxide polymer breaker within the microemulsion will be released from the microemulsion and then break the gel caused by the polymer, whether the polymer is within the gelled fluid, or within the wellbore, or within a hydraulic fracture, or in the form of filter cake. This is accomplished by breaking the polymer chains. The components, mechanisms, and performance characteristics of the breaking fluid and its efficiency for breaking a polymer-gelled fluid having delayed release of polymer breaker that can also be utilized for removing residual gelled material from the formation and proppant pack will be described.

The polymer-gelled fluids with breaker nanoemulsion or microemulsion may be used for regular hydraulic fracturing, acid diverting, frac-packing, gravel packing, and for remedial cleanup treatments. Additionally, the breaker fluid may also be used in a polymer-gelled aqueous pad, and then followed by a crosslinked polymer fluid to carry proppant into the fracture. After the oil-soluble organic peroxide in the internal breaker fluid diffuses out from the internal phase of the breaker nanoemulsion or microemulsion and are released they break the following or subsequent polymer fluid-proppant stage. However, in most situations reliance on diffusion of breaker from the pad into the polymer-gelled aqueous fluid will not be suitable for a complete break. In many instances, internal breakers are more suitable.

It will be appreciated that the breaker microemulsion described herein may be used either as an external breaker or an internal breaker of the polymer gelled fluids. By the term "internal breaker" is meant that the breaker is present in the fluid along with the composition causing the increase in viscosity, e.g. polymers, as contrasted with adding the breaker to the gelled fluid separately, for instance, injecting the breaker downhole after the gelled treating fluid.

Liquids gelled with polymers have increased viscosity due to the long polymer chains which may become entangled. Viscosity may be further increased by crosslinking the polymer chains. Polymer gelled fluids may form polymeric filter cakes on and within the formation. Some polymers are naturally occurring, such as xanthan gum, guar gum and starch. Other polymers are modified natural polymers, such as derivatives of guar gum (hydroxypropyl guar (HPG), carboxymethyl hydroxypropyl guar (CMHPG)), carboxymethylcellulose (CMC), hydroxyethylcellulose (HEC), carboxymethyl hydroxyethylcellulose (CMHEC) and hydroxypropyl starch and lignosulfonate. Some are synthetic such as polyacrylates and polyacrylamides. Polymers may be classified by their structure and may be linear or branched, and in turn, crosslinked. Crosslinkers include, but are not necessarily limited to borate, titanate, zirconate, chromium (III) salt, and combinations thereof. Copolymers contain two or more different monomers that can be arranged randomly or in blocks. As noted, in solution, entangled polymer chains can create networks, giving complex viscosity behavior. Generally, the amount of polymer gelling agent may range from about 0.1 independently to about 10 vol %, based on the total aqueous fluid; alternatively about 0.5 independently to about 3 vol %. By "independently" herein with respect to ranges is meant that any lower threshold may be combined with any upper threshold to give a valid alternative range. Reducing the viscosity or molecular weight of the polymer component, whether in a gelled fluid, within a fracture or in a filter cake or elsewhere involves degrading the polymer chains.

In the methods and compositions described herein, for instance an aqueous fracturing fluid, as a non-limiting example, is first prepared by blending a polymer into an aqueous base fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

As noted, the aqueous fluids gelled by the polymers herein may optionally be brines. In one non-limiting embodiment, the brines may be prepared using salts including, but not necessarily limited to, NaCl, KCl, $CaCl_2$, $MgCl_2$, $NH_4Cl$, $CaBr_2$, NaBr, sodium formate, potassium formate, cesium formate, and other commonly used stimulation and completion brine salts. The concentration of the salts to prepare the brines can be from about 0.5% by weight of water up to near saturation for a given salt in fresh water, such as 10%, 20%, 30%, 40% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

For remedial treatments, such as removal of residual crosslinked polymer filter cake typically left within a hydraulic fracture after a crosslinked polymer fluid fracturing treatment, the distribution of an oxidative polymer breaker, such as a peroxide, particularly an organic peroxide agent within the damaged hydraulic fracture can be significantly improved by using the microemulsion described herein.

Suitable organic peroxides include, but are not necessarily limited to, cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, and combinations thereof.

In one non-restrictive embodiment, for the microemulsions and nanoemulsions herein the suitable water-soluble surfactants include, but are not limited to, non-ionic, anionic, cationic, zwitterionic surfactants, amphoteric surfactants, switchable surfactants, cleavable surfactants, dimeric or gemini surfactants, extended surfactants containing a non-ionic spacer arm central extension and an ionic or nonionic polar group, and mixtures thereof. Suitable non-ionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, and mixtures thereof. Suitable cationic surfactants include, but are not necessarily limited to, arginine methyl esters, alkanolamines and alkylenediamides. In one non-limiting embodiment at least two surfactants in a blend may be used to create the breaker fluid. Suitable surfactants may also include switchable, cleavable, dimeric or gemini surfactants and surfactants containing a non-ionic spacer arm central extension and an ionic or nonionic polar group. The non-ionic spacer-arm central extension may be the result of polypropoxylation, polyethoxylation, or a mixture of the two, in non-limiting embodiments.

In one non-limiting embodiment the microemulsion has an absence of a propionate.

In another non-limiting version of the breaker microemulsion, the volume ratio of aqueous phase to water-soluble surfactant to non-aqueous or oil-soluble organic peroxide phase is: about 10 to about 80 vol % aqueous external phase to about 1 to about 20 vol % water-soluble surfactant to about 10 to about 90 vol % non-aqueous or oil-soluble phase, which may be entirely organic peroxide. In a non-restrictive alternative embodiment of the dual-functional breaker emulsion, the volume ratio of aqueous phase to water-soluble surfactant to organic peroxide phase is: about 40 to about 60 vol % oil phase to about 5 to about 15 vol % oil-soluble surfactant to about 40 to about 60 vol % water phase. In one non-limiting embodiment the aqueous phase is an external phase. In another non-restrictive version, the aqueous phase is an internal phase.

Within the above volume ratios, the concentration of oil-soluble organic peroxide (oxidizer) in the non-aqueous phase ranges from about 72 to about 100 weight %; alternatively from about 32 independently to about 48 weight %.

The microemulsion may be added to the aqueous fluid before, during or after the aqueous fluid is gelled with the polymer. In the case of a microemulsion, the aqueous phase and the non-aqueous phase are bi-continuous.

The non-aqueous internal phase of the breaker microemulsion may employ one or more, mineral oil, synthetic oil, esters, terpenes, ketones, naphthenic solvents, aromatic solvents, aliphatic solvents, or the like as a non-limiting example of a suitable optional co-solvent. It is permissible for the non-aqueous internal phase to comprise, consist of or consist essentially of one or more organic peroxides. Suitable aliphatic solvents include, but are not necessarily limited to, pentane, hexane, mineral oil, and the like. Suitable synthetic oils include, but are not necessarily limited to, esters, diesters, polyesters, and the like. Suitable ester solvents include, but are not necessarily limited to, benzyl benzoate, bis(2-ethylhexyl) adipate, bis(2-ethylhexyl)phthalate, butyl acetate, sec-butyl acetate, tert-butyl acetate, diethyl carbonate, dioctyl terephthalate, ethyl acetate, ethyl acetoacetate, ethyl butyrate, ethyl lactate, ethylene carbonate, hexyl acetate, isoamyl acetate, isobutyl acetate, isopropyl acetate, methyl acetate, methyl phenylacetate, propyl acetate, propylene carbonate, triacetin, and the like. Suitable terpene solvents include, but are not necessarily limited to, turpentine, hemiterpenes and monoterpenes up to triterpenes such as squalene and the like. Suitable ketone solvents include, but are not necessarily limited to, acetone, acetophenone, butanone, ethyl isopropyl ketone, isophorone, methyl isobutyl ketone, methyl isopropyl ketone, 4-methylpent-3-en-2-one (mesityl oxide), 3-pentanone and the like. Suitable naphthenic solvents include, but are not necessarily limited to, naphthalene, naphthenic oil, and the like. Suitable aromatic solvents include, but are not necessarily limited to, benzene, xylene, toluene, and the like.

The rate of viscosity break for a given reservoir temperature by the methods described herein is influenced by type and amount of salts within the mixed water (i.e. seawater, KCl, NaCl, NaBr, $CaCl_2$, $CaBr_2$, HCOOK, HCOONa, $NR_4Cl$ and the like), presence of an optional co-surfactant (i.e. a short alcohol molecule (in non-limiting examples, propanol, butanol, pentanol in their different isomerization structures) as well as glycols, and ethoxyated and propoxylated alcohols or phenols), optional polymer type (i.e. non-crosslinked or crosslinked polysaccharide, and the like), polymer loading, the amount of organic peroxide breaker used, the nature and amount of any optional co-solvent, the presence of components such as aromatic hydrocarbons, and the like.

Optional co-solvents may include, but are not necessarily limited to, olefin synthetic oil, esters made from vegetable fatty acids and alcohols, ethers and polyethers made from alcohols and polyalcohols, paraffinic or aromatic hydrocarbons, alkyl benzenes, terpenes and other natural products and mixtures of these types and mineral oils such as relatively higher molecular weight mineral oils, types like GLORIA® and HYDROBRITE® 200 from Crompton Corporation. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from ExxonMobil Chemical, and similar products from other mineral oil manufacturers. The ESCAID 110® and Conoco LVT-200® mineral oils have been well known components of oil-based drilling muds and the oil industry has considerable experience with these products, thus making them attractive choices. The mineral oils from Conoco-Phillips Company with their high purity and high volume use within other industries are also an attractive choice, such as 600N PURE PERFORMANCE® Base Oil.

In one non-limiting embodiment, the breaking or viscosity reduction is triggered or initiated or facilitated by heat. The organic peroxides will slowly, upon heating, break or reduce the viscosity of the polymer gel with the addition of or in the absence of any other viscosity reducing agent. The amount of internal breaker (organic peroxide, e.g.), needed to break a polymer-gelled fluid may in some cases be temperature dependent, with less needed as the fluid temperature increases. Once a fluid is completely broken at an elevated temperature and cooled to room temperature no appreciable degree of viscosity reheal is expected to occur, and in most cases no rehealing is expected. The effective amount of organic peroxide in the gelled aqueous fluid ranges from about 1 independently to about 5 gptg based on the total fluid, in another non-limiting embodiment the amounts of organic peroxide may range from about 1 independently to about 3 gptg, where "total fluid" means overall polymer-gelled fluid with all components of the particular embodiment. It will be appreciated that units of gallon per thousand gallons (gptg) are readily converted to SI units of the same value as, e.g. liters per thousand liters (lpt1), $m^3/1000\ m^3$, etc.

Controlled viscosity reduction rates may be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the polymer gel would break at or near the formation temperature to deliver the breaking agent downhole at a predetermined or designed location.

In one non-limiting embodiment, fluid internal breaker design may be based primarily on formation temperature, i.e. the temperature the fluid will be heated to naturally in the formation once the acidizing, fracturing or other treatment is over. Fluid design may take into account the expected duration or exposure of the fluid at formation temperature during a treatment. There would generally be no additional temperature or heating the polymer-gelled fluid would see or experience other than original reservoir temperature. However, such additional heating or applied external temperature may be optionally used.

It is sometimes difficult to specify with accuracy in advance the amount of the various breaking components that should be added to a particular aqueous fluid gelled with at least one polymer to sufficiently or fully break the gel, in general. For instance, a number of factors affect this proportion, including but not necessarily limited to, the particular polymer used to gel the fluid; the particular breaker(s) used (e.g. organic peroxide (oxidizer) etc.); the temperature of the fluid; the downhole pressure of the fluid, the starting pH of the fluid; and the complex interaction of these various factors. Nevertheless, in order to give an approximate idea of the proportions of the various breaking components to be used in the methods herein, approximate ranges will be provided. The effective amount of the breaker microemulsion ranges from about 0.5 to about 5 gptg based on the gelled aqueous fluid; alternatively the effective amount of the breaker microemulsion ranges from about 1 independently to about 2 gptg based on the gelled aqueous fluid.

The use of the disclosed breaker microemulsion systems is ideal for controlling viscosity reduction of polymer based fracturing treating fluids. The breaking system may also be used for breaking similar gravel pack fluids, acidizing or near-wellbore clean-up fluids, loss circulation pill fluids that include polymers, drilling fluids composed of polymers, and for many other applications. The breaker microemulsion system may additionally work for foamed fluid applications (hydraulic fracturing, acidizing, and the like), where $N_2$ or $CO_2$ gas is used for the gas phase. The breaking methods herein are a significant improvement in that they give more complete breaks for polymer based fluids, such as borate crosslinked guar and linear HEC (hydroxyethylcellulose), at elevated temperatures. Generally, oxidizers are internal breakers and all are triggered to act at formation temperature. In other words, the oxidizer (organic peroxide) is chosen to be triggered that the formation temperature for which the fluid is designed.

Also, in another non-restrictive version, the only polymer breaker employed to reduce polymer-caused viscosity is the organic peroxide oxidizer taken singly. That is, a separately introduced external breaker component introduced after the polymer-gelled fluid is not used (e.g. various clean-up fluids or external breakers). However, conditions (such as elevated temperature) and already existing chemicals may be present when and where the internal breakers described herein are included, either intentionally or incidentally.

The compositions of the polymer gelled fluids herein may be a combination of the noted internal breakers with one or more high temperature optional stabilizers, optional viscosity enhancers, fluid loss control agents, and mix water brines up to 14.4 ppg salinity (1.7 kg/liter), e.g. $CaBr_2$. The internal breakers described herein work in the presence of several types of stabilizers, viscosity enhancers, fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is unique and allows the many enhanced polymer fluid performance properties to be combined.

In polymer filter cake, most of breaker in the polymer fluid system is leaked-off into the formation matrix and leaves a high concentration of polymer in the cake (fracture). The breaker is not attached to or connected with the polymer. However, in the case of the methods and compositions herein, the oxidizer breaker, or additionally and optionally another polymer breaker, is in the oil-soluble internal phase and prevented or inhibited from breaking the polymer-gelled component of the fluid and of the filter cake by the aqueous external phase of the microemulsion and surfactant. There is no sharp or abrupt release mechanism of the organic peroxide from the internal phase of the microemulsion. Breaking occurs relatively gradually as the organic peroxide migrates from the internal phase of the microemulsion to encounter the polymer. Thermal decomposition of the organic peroxide into radical takes place relatively slowly, especially at lower temperatures. Thus, it takes a while before the oil-soluble oxidizer is released to break the polymer-gelled component of the gelled aqueous fluid and for the oil-soluble organic peroxide to break the polymer component of the gelled fluid.

A viscous gel starts to develop when the polymer is mixed with an aqueous base fluid. The polymer-gelled fluid (in one non-limiting embodiment, a fracturing fluid) is pumped in one or more sequential stages. The stages of polymer-gelled fluid that contains the breaker microemulsion maintains a high viscosity prior to fracturing and/or other treating fluid applications and eventual breaking (viscosity reduction) of the fluid through action of the organic peroxide breaker and/or other oxidizer breaker.

There are aqueous fluids gelled with polymers that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There has evolved in the stimulation fluid art an industry standard need for "quick gel break". There needs to be a method for breaking polymer-gelled fluids at elevated temperatures that can be as easy, as quick, and as economic as breaking polymeric fluids conventionally at lower temperatures, in one non-limiting embodiment, using an internal breaker. At the same time, it is not desirable to reduce the viscosity of the fluid, i.e. break the gel, immediately or essentially instantaneously prematurely. That is, in one non-limiting embodiment, the methods and compositions herein do not break the gelled aqueous fluid essentially instantaneously, which may be defined as less than one-half hour, alternatively one hour or less, and in another non-restrictive embodiment two hours or less, or in another non-limiting embodiment five hours or less. Of concern is the fact that an unbroken polymer fluid has exceptionally high viscosity at very low shear rate and static conditions which makes it difficult for an external breaker to contact all of the polymer-gelled fluid and to displace it from the pores of a treated reservoir. This is particularly true for gas reservoirs and crude oil reservoirs that have heterogeneous permeability with high relative permeability sections present.

As described herein new compositions and new methods have been discovered using breaker microemulsions and/or nanoemulsions to reduce the viscosity of aqueous fluids gelled with polymers. These breakers are internal and do not break the gel or reduce the viscosity immediately, but instead the breaking activity is delayed or occurs later after the gelled fluid achieves its purpose. The improvements will allow relatively very quick breaks, such as within about 1 to about 16 hours, compared to using other means to break gelled polymer fluids which may take at least 48 or more hours. In another non-limiting embodiment the break occurs within about 1 to about 8 hours; alternatively from about 1 to about 4 hours, and in another non-restrictive version about 1 to about 2 hours. Using the methods and microemulsions herein, breaking at elevated temperature or room or ambient temperature may reduce the viscosity of the previously-gelled fluid to less than 100 cPs. The breaker microemulsion herein can be used as an internal breaker, e.g. added to the gel after batch mixing of a polymer-gel treatment, or added on-the-fly after continuous mixing of a polymer-gel treatment using a liquid additive metering system in one non-limiting embodiment, or the breaker microemulsion may be used separately, if needed, as an external breaker solution to remove hybrid gelled fluids already placed downhole.

The breaker microemulsions and nanoemulsions described herein, being aqueous phase external, are readily solubilized in the brine or aqueous base fluid, and may interact with the polymers initially as dispersed microscopic oil droplets.

The invention will now be further illustrated with respect to particular Examples which are not intended to limit the invention in any regard, but instead are intended to further describe and illuminate certain non-restrictive embodiments of the invention.

EXAMPLES

Purposes of this project included, but were not necessarily limited to, developing a breaker that is soluble in water-based fracturing fluids, has delayed break profiles, works effectively at temperatures 180-250° F. (82-121° C.) and shows no rehealing at room temperature (about 20-25° C.) during rheology testing—however it is not necessary that all compositions and all methods accomplish all of these purposes. In order to achieve one or more of these purposes, studies of microemulsion formulation with organic peroxide were conducted.

Mesophase Testing

In this phase, the task was to determine an equivalent alkane carbon number (EACN) of the organic breaker by using an internal salinity scan and interfacial tension testing (IFT) procedures. Using this EACN number, the task was then to develop a microemulsion by evaluating the phase behaviors of different surfactant packages. Suitable surfactant packages include, but are not limited, to polyglucosides, sulfonates, ethoxylated alcohols, and polysorbates. The final formulation of the microemulsion must be stable at storage temperatures between −5° F. and 100° F. (−21 and 38° C.). Some of the various surfactants explored are shown in Table I.

TABLE I

Surfactant Candidates

| Surfactant | Type | Classification |
| --- | --- | --- |
| TWEEN 85 | Non ionic | Polysorbate ester |
| TERGITOL15-S-9 | Non ionic | Alcohol ethoxylate |
| TERGITOL15-S-12 | Non ionic | Alcohol ethoxylate |
| Sodium dodecyl sulfate | Anionic | Alkyl Sulfate |
| TERGITOL 15-S-7 | Non ionic | Alcohol ethoxylate |
| TERGITOL 15-S-3 | Non ionic | Alcohol ethoxylate |
| TERGITOL 15-S-5 | Non ionic | Alcohol ethoxylate |
| WITCONATE AOS | Anionic | Alpha olefin Sulfonate |
| WITCONATE NAS-8 | Anionic | Alkyl Sulfonate |
| DFR 738 | Non ionic | Alkyl polyglucoside |
| DFR 737 | Non ionic | Polyglycerol ester |
| DFR 740 | Non ionic | Alkyl polyglucoside |
| DFR 733 | Anionic | Alkyl Disulfonate |
| DFR 1643 | Anionic | Alkyl Sulfosuccinate |
| DFR 764 | Non ionic | Alcohol ethoxylate |

DFR 738, DFR 737, DFR 740, DFR 733, DFR 1643 and DFR 764 are experimental drilling fluid products available from Baker Hughes Breaker Testing Once the microemulsion was been developed, the microemulsion will be added to the final fracturing fluid formulation and tested using a FANN 50 viscometer. All fracturing fluids were made with Tomball, Tex. Tap water. The fracturing fluids were prepared by hydrating 1 liter of linear gel fluid for 30 minutes using a standard SERVODYNE mixer with a high-efficiency paddle at 1500 rpm. The base gel viscosity was measured on an OFITE 900 viscometer using a R1B1 bob@511 s$^{-1}$.

In the FANN 50 testing, the fluid was sheared at laboratory ambient temperature (68° F. (20° C.)) for 2 minutes and then sheared at 100 s$^{-1}$ constant shear with shear rate sweep of 100, 80, 60 and 40 to calculate n and K power law viscosity indices at ambient temperature. The fluid was then tested at elevated temperature (pre-set) under shear and the shear sweep was repeated every 30 minutes. A R1B5 rotor-bob configuration was used. Fluid composition is shown in Table II

TABLE II

FLUID COMPOSITION
Lightning 2800 @ 215° F. (102° C.)
28 ppt (about 0.336 wt % guar (GW-3) fluid crosslinked with XLW-30
Tomball Texas Tap Water (balance)

| | |
|---|---|
| 7 gptg (lptl) GW-3LDF | GW-3 (a grade of guar powder) available from Baker Hughes Incorporated. |
| 1 gptg (lptl) CT-3C | clay control additive available from Baker Hughes Incorporated. |
| 2 gptg (lptl) MA-844W | flow back additive, a surfactant blend available from Baker Hughes Incorporated. |
| 2.5 gptg (lptl) BF-7L | buffer used in this specific fluid to adjust pH available from Baker Hughes Incorporated. |
| 0.8 gptg (lptl) XLW-30 AG | crosslinker for this fluid, available from Baker Hughes Incorporated. |
| 0.2 gptg (lptl) XLW-32 | another crosslinker available from Baker Hughes Incorporated. |

RESULTS

EACN Determination

Using internal procedures, the EACN of the organic peroxide used was determined to be approximately 13. With this number, the microemulsion was developed by evaluation of different surfactant packages. Table III below summarizes the formulation that resulted in a microemulsion that was stable between -5° F. and 100° F. (-21 and 38° C.). The organic peroxide breaker used in the microemulsion was t-butyl peroxide.

TABLE III

STABLE MICROEMULSION FORMULATION

| Surfactant Exp. Number | Type | Classification |
|---|---|---|
| DFR 1643 | Anionic | Alkyl Sulfosuccinate |
| DFR 764 | Non ionic | Alcohol ethoxylate |

DFR 1643 and DFR 764 are experimental drilling fluid products available from Baker Hughes The breaker testing results presented in the FIGURE show that the baseline fluid formulation without breaker had a maximum viscosity of 900 cP at 100 s$^{-1}$, maintained approximately 200 cP at 100 s$^{-1}$ after 800 minutes at 215° F. (102° C.), and when the fluid was cooled to room temperature, the fluid regained viscosity to approximately 1000 cP (T-612, black line; squares relate to right y-axis for temperature). However, the fluid formulation with 1 gptg (1 lptl) microemulsion breaker additive decreased the viscosity to less than 100 cP at 100 s$^{-1}$ after 170 minutes and showed no signs of rehealing upon cooling, thus demonstrating breaking by the t-butyl peroxide used in the microemulsion (T-705, gray line; again, squares relate to right y-axis for temperature).

CONCLUSIONS

The final formulation for the microemulsion breaker additive was stable during evaluation between -5° F. and 100° F. (-21 and 38° C.). The microemulsion was also soluble in water-based fracturing fluids, had delayed break profiles, worked effectively at temperatures in the range of 180-250° F. (82-121° C.) and showed no rehealing at room temperature during rheology testing.

The FANN 50 rheology testing shows that the fluid formulation with 1 gptg (1 lptl) microemulsion breaker additive decreased fluid viscosity to less than 100 s$^{-1}$ after approximately 210 minutes and showed no signs of rehealing upon cooling.

In the foregoing specification, the invention has been described with reference to specific embodiments thereof as effective in breaking aqueous fluids gelled with polymers. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of polymers (e.g. polysaccharides), crosslinkers, organic peroxide breakers, surfactants, optional co-surfactants, optional co-solvents, and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed. For example, the gelled aqueous fluid may consist essentially of or consist of an aqueous base fluid, a polymer in an amount effective to increase the viscosity of the aqueous fluid, and a breaker fluid that consists of, or consists essentially of, a nanoemulsion or a microemulsion that consists of or consists essentially of an aqueous phase, a non-aqueous phase consisting of or consisting essentially of at least one organic peroxide, where the amount of organic peroxide is effective to reduce the viscosity of the aqueous fluid, and at least one surfactant effective to form a breaking fluid with the aqueous phase and the oil phase. Other oil-soluble breakers, such as enzymes, acids, and combinations thereof can also be in one of the phases of the dual-function breaker emulsion to break polymer.

In another non-limiting embodiment there is provided a method for reducing the viscosity of an aqueous fluid having increased viscosity gelled with a polymer, which method consists of or consists essentially of adding to the gelled aqueous fluid a breaker fluid that consists of a nanoemulsion or a microemulsion, where the breaker fluid contains at least one organic peroxide in an amount effective to reduce the viscosity of the aqueous fluid, where the breaking fluid consists of or consists essentially of an aqueous phase, a non-aqueous phase comprising at least one organic peroxide, and at least one surfactant effective to form a nanoemulsion or microemulsion with the aqueous phase and the non-aqueous phase; and where the method additionally consists of or consists essentially of reducing the increased viscosity of the aqueous fluid by contact of the polymer with the at least one organic peroxide.

Further, the breaker fluid may be a microemulsion that comprises a non-aqueous internal phase that consists of or consists essentially of at least one organic peroxide.

The words "comprising" and "comprises" as used throughout the claims, are to be interpreted to mean "including but not limited to" and "includes but not limited to", respectively. In one non-limiting embodiment the non-aqueous internal phase of the microemulsion consists of at least one organic peroxide.

What is claimed is:

1. A gelled aqueous fluid comprising:
    an aqueous base fluid,
    a polymer in an amount effective to increase the viscosity of the aqueous fluid, and
    a breaker fluid selected from the group consisting of microemulsions and nanoemulsions, the breaker fluid further comprising:
        an aqueous phase,
        a non-aqueous phase comprising at least one organic peroxide, where the amount of the at least one organic peroxide is effective to reduce the viscosity of the gelled aqueous fluid, and
        at least one surfactant effective to form a breaker fluid selected from the group consisting of microemulsions and nanoemulsions with the aqueous phase and the non-aqueous phase;
    where the volume ratio of aqueous phase to surfactant to non-aqueous phase in the breaker fluid is about 10 to about 80 vol % aqueous phase to about 1 to about 20 vol % surfactant to about 10 to about 90 vol % non-aqueous phase, and where the concentration of the at least one organic peroxide in the non-aqueous phase ranges from about 32 to about 100 weight %.

2. The gelled aqueous fluid of claim 1 where the at least one organic peroxide is selected from the group consisting of cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, and combinations thereof.

3. The gelled aqueous fluid of claim 1 where the gelled aqueous fluid is a fracturing fluid.

4. The gelled aqueous fluid of claim 1 where the polymer is a crosslinked polysaccharide.

5. The gelled aqueous fluid of claim 1 where the effective amount of the at least one organic peroxide ranges from about 1 to about 5 gptg (about 1 to about 5 lptl) based on the gelled aqueous fluid.

6. A gelled aqueous fluid comprising:
    an aqueous base fluid,
    a polymer in an amount effective to increase the viscosity of the aqueous fluid, and
    a breaker fluid selected from the group consisting of microemulsions and nanoemulsions, the breaker fluid further comprising:
        an external aqueous phase,
        an internal non-aqueous phase comprising at least one organic peroxide, where the amount of the at least one organic peroxide is effective to reduce the viscosity of the gelled aqueous fluid, and
        at least one surfactant effective to form a breaker fluid selected from the group consisting of microemulsions and nanoemulsions with the external aqueous phase and the internal non-aqueous phase;
    where the volume ratio of aqueous phase to surfactant to non-aqueous phase in the breaker fluid is about 10 to about 80 vol % aqueous phase to about 1 to about 20 vol % surfactant to about 10 to about 90 vol % non-aqueous phase, and where the concentration of the at least one organic peroxide in the non-aqueous phase ranges from about 32 to about 100 weight %.

7. The gelled aqueous fluid of claim 6 where the at least one organic peroxide is selected from the group consisting of cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, and combinations thereof.

8. The gelled aqueous fluid of claim 6 where the gelled aqueous fluid is a fracturing fluid.

9. The gelled aqueous fluid of claim 6 where the polymer is a crosslinked polysaccharide.

10. The gelled aqueous fluid of claim 6 where the effective amount of the at least one organic peroxide ranges from about 1 to about 5 gptg (about 1 to about 5 lptl) based on the gelled aqueous fluid.

11. A gelled aqueous fluid comprising:
    an aqueous base fluid,
    a polymer in an amount effective to increase the viscosity of the aqueous fluid, and
    a breaker fluid selected from the group consisting of microemulsions and nanoemulsions, the breaker fluid further comprising:
        an external aqueous phase,
        an internal non-aqueous phase comprising at least one organic peroxide, where the amount of the at least one organic peroxide is effective to reduce the viscosity of the gelled aqueous fluid, and
        at least one surfactant effective to form a breaker fluid selected from the group consisting of microemulsions and nanoemulsions with the aqueous phase and the non-aqueous phase, and
    the volume ratio of aqueous external phase to surfactant to non-aqueous internal phase in the breaker fluid is:
        about 10 to about 80 vol % aqueous phase to
        about 1 to about 20 vol % surfactant to
        about 10 to about 90 vol % non-aqueous phase, and
    where the concentration of the at least one organic peroxide in the non-aqueous phase ranges from about 32 to about 100 weight %.

12. The gelled aqueous fluid of claim 11 where the at least one organic peroxide is selected from the group consisting of cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, and combinations thereof.

13. The gelled aqueous fluid of claim 11 where the gelled aqueous fluid is a fracturing fluid.

14. The gelled aqueous fluid of claim 11 where the polymer is a crosslinked polysaccharide.

15. The gelled aqueous fluid of claim 11 where the effective amount of the at least one organic peroxide ranges from about 1 to about 5 gptg (about 1 to about 5 lptl) based on the gelled aqueous fluid.

* * * * *